Oct. 19, 1965   B. J. WESTON   3,212,608
CAM ACTUATING MEANS IN SHOE DRUM BRAKES
Filed July 25, 1963   7 Sheets-Sheet 1
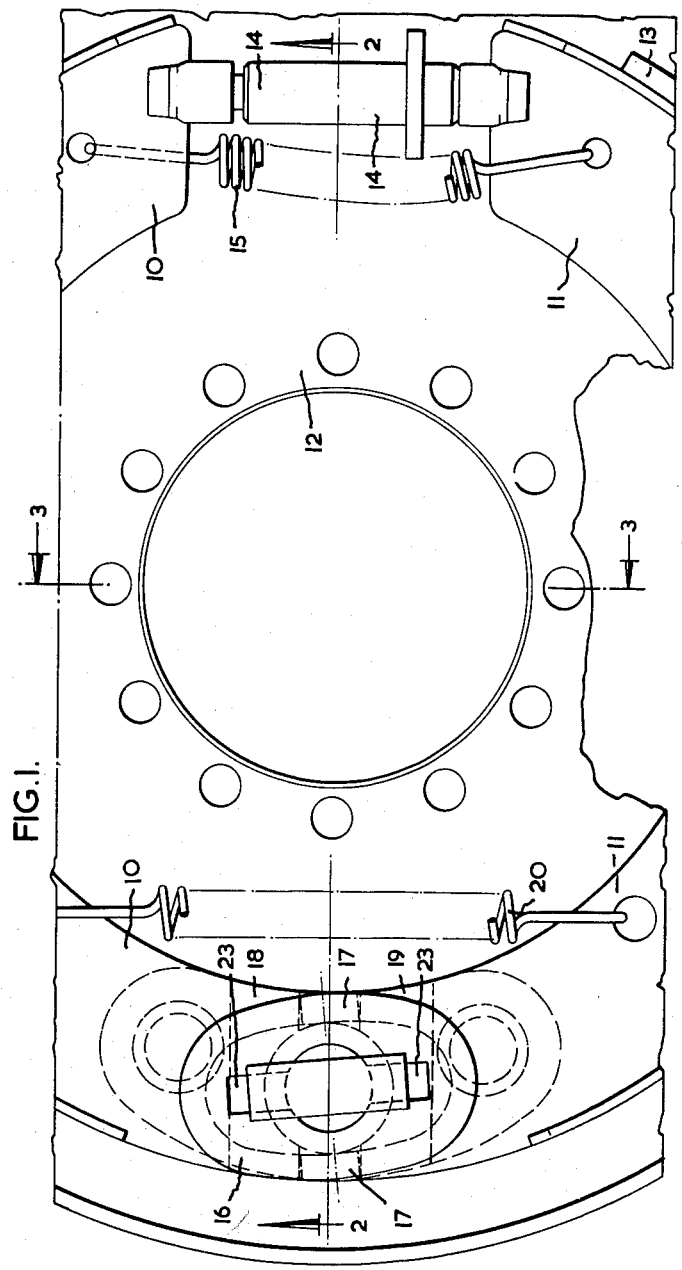
Inventor
Barry James Weston
By: Scrivener and Parker
Attorneys Oct. 19, 1965  B. J. WESTON  3,212,608
CAM ACTUATING MEANS IN SHOE DRUM BRAKES
Filed July 25, 1963  7 Sheets-Sheet 2
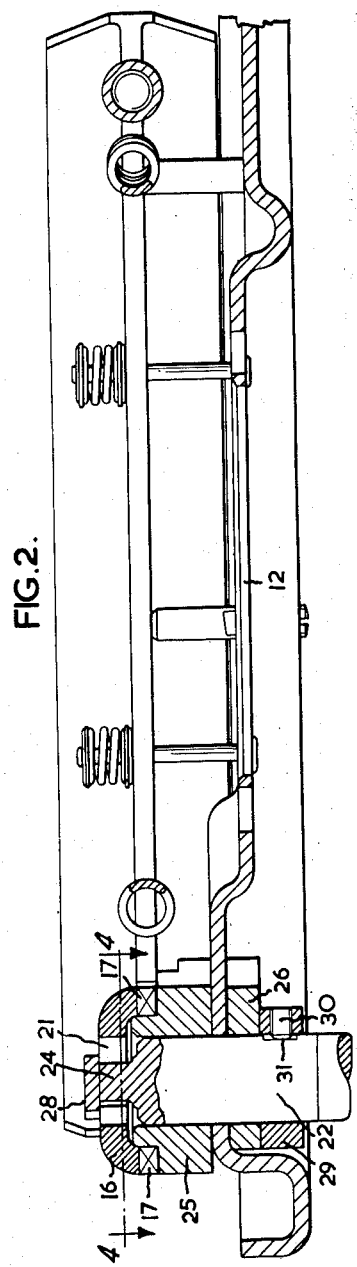
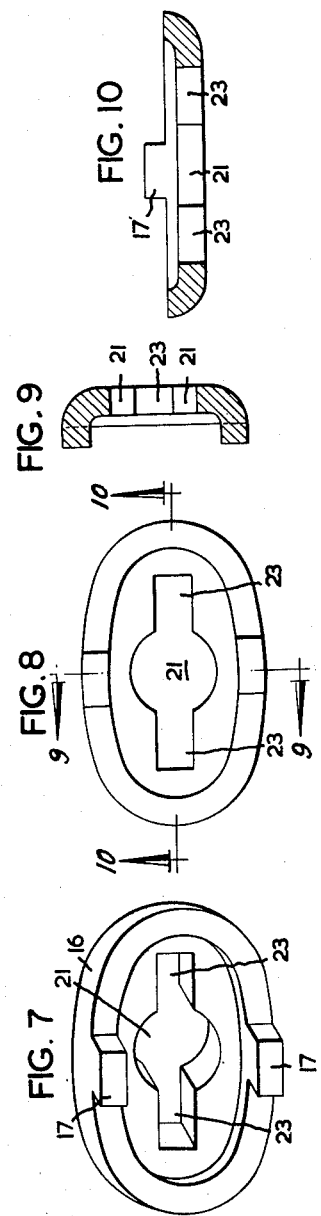
Inventor
Barry James Weston
By: Scrivener and Parker
Attorneys Oct. 19, 1965  B. J. WESTON  3,212,608
CAM ACTUATING MEANS IN SHOE DRUM BRAKES
Filed July 25, 1963  7 Sheets-Sheet 5

Inventor
Barry James Weston
By: Scrivener and Parker
Attorneys

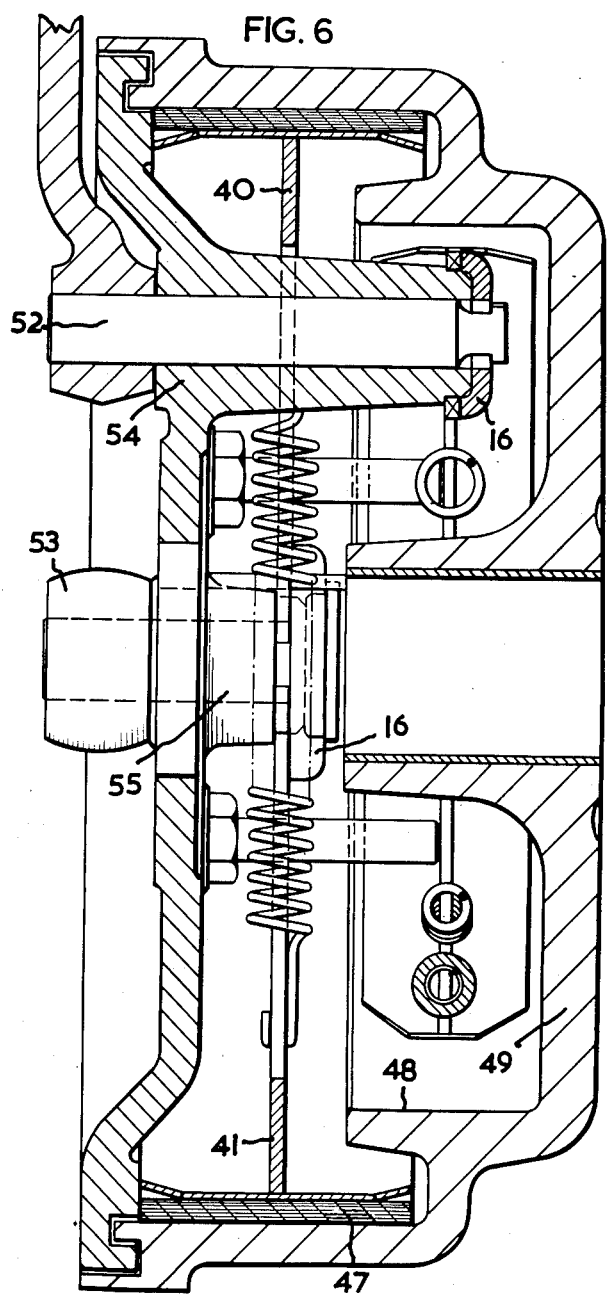

United States Patent Office 3,212,608
Patented Oct. 19, 1965

3,212,608
CAM ACTUATING MEANS IN SHOE DRUM BRAKES
Barry James Weston, Bearwood, Smethwick, England, assignor to Girling Limited, Tyseley, Birmingham, England, a British company
Filed July 25, 1963, Ser. No. 297,587
Claims priority, application Great Britain, July 31, 1962, 25,188/62
17 Claims. (Cl. 188—78)

This invention relates to improvements in shoe drum brakes of the kind in which opposed arcuate shoes are adapted to be separated to bring the shoes into engagement with a rotatable drum by an angularly movable cam located between adjacent ends of the shoes, the other ends of the shoes being adapted to fulcrum on a stationary anchor or anchors or being articulated together.

According to the present invention, in a brake of that kind the shoes are separated to apply the brake by a cam which is permitted a limited movement in a circumferential direction with the shoe ends and is partially rotated to apply the brake by a cam shaft on which the cam is mounted and which is rotatable about a stationary axis.

In a brake in which the shoes fulcrum at their non-actuated ends on a fixed anchor or anchors, the floating cam permits centralising of the shoes.

In a brake of the duo-servo type in which the ends of the shoes remote from the actuator are articulated together or otherwise connected so that on application of the brake the primary shoe transmits a circumferentially directed force to the secondary shoe, the torque on the shoes may be taken by a bearing in which the cam shaft is rotatably mounted. Alternatively the torque can be taken by pins fixed in the stationary back-plate of the brake and projecting into slots in the shoe webs.

Figure 3:
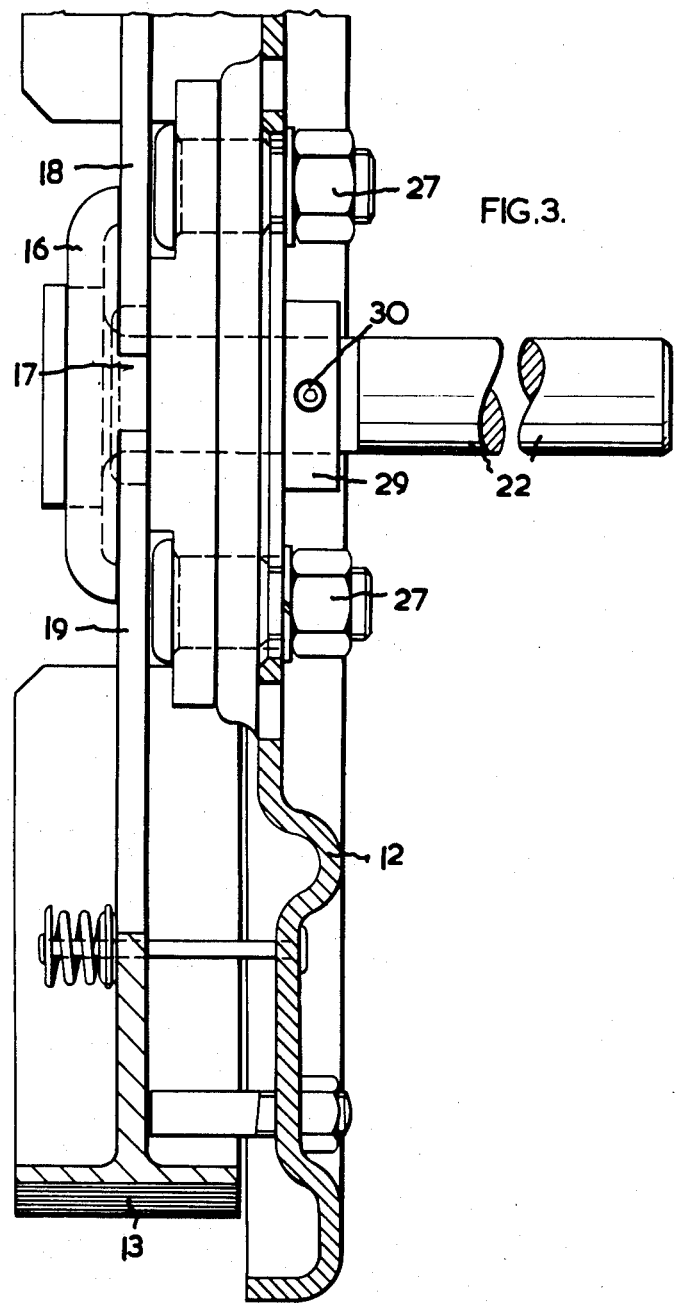
Figure 4:
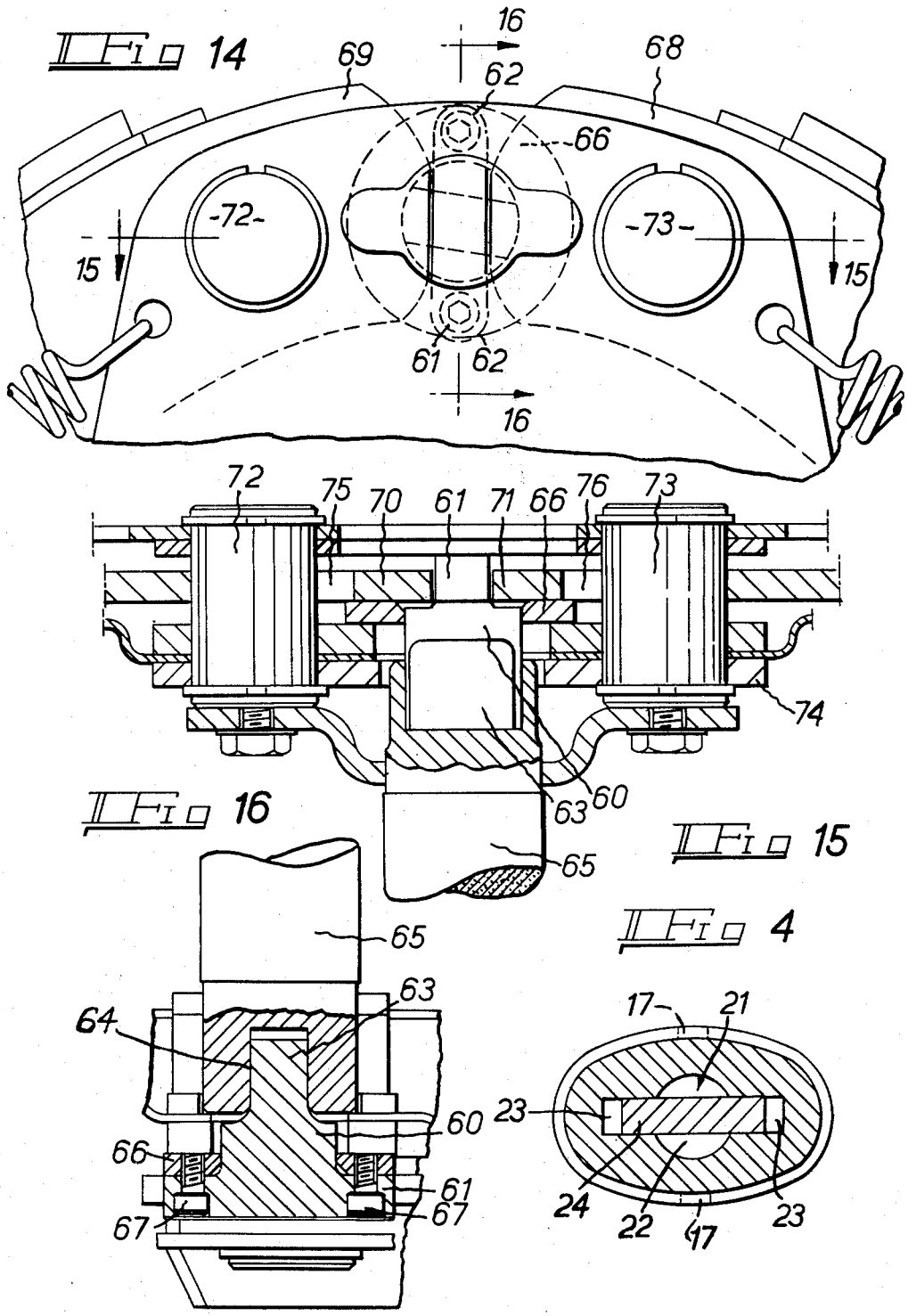
Figure 5:
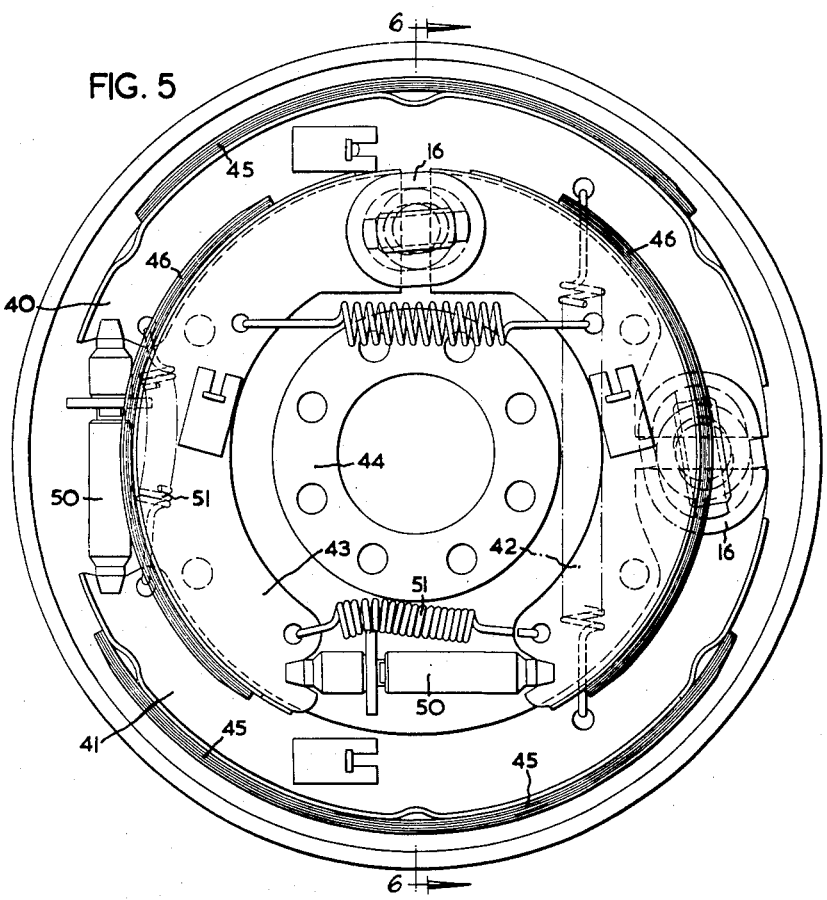
Figure 11:
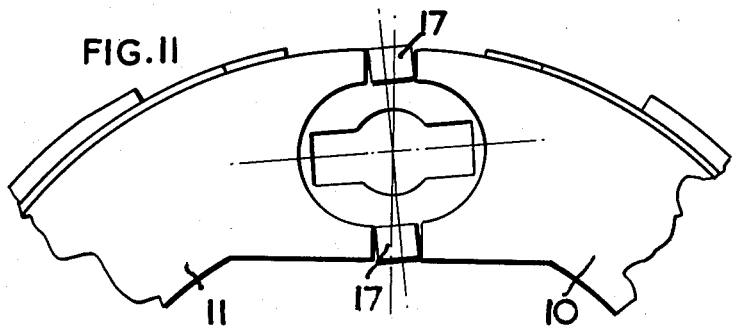
Figure 13:
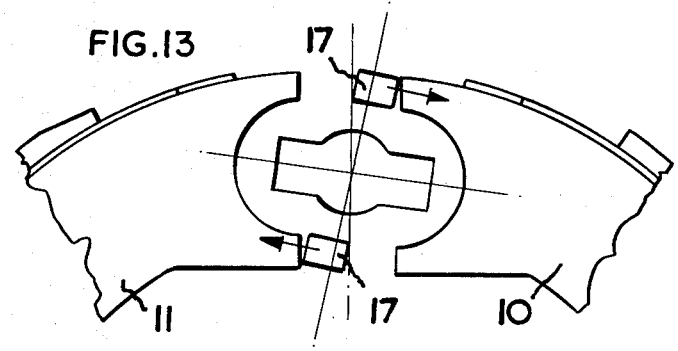
Figure 12:
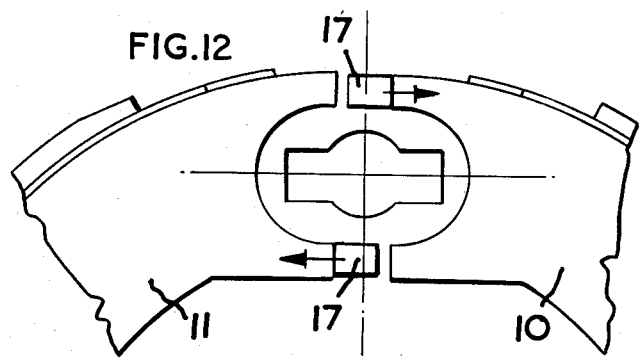

Three practical forms of shoe drum brake embodying a cam in accordance with the present invention are illustrated by way of example in the accompanying drawings in which:

FIGURE 1 is an end elevation of part of a brake in which the shoes are separated by a cam in accordance with the present invention;
FIGURE 2 is a section on the line 2—2 of FIGURE 1 and showing the mounting of the cam;
FIGURE 3 is a section on line 3—3 of FIGURE 1;
FIGURE 4 is a section on the line 4—4 of FIGURE 2;
FIGURE 5 is an end elevation of a brake similar to FIGURE 1 but including two independently operated pairs of shoes;
FIGURE 6 is a section on the line 6—6 of FIGURE 5;
FIGURE 7 is a perspective view of a cam in accordance with the present invention;
FIGURE 8 is an elevation of the cam in FIGURE 7;
FIGURE 9 is a section on line 9—9 of FIGURE 7;
FIGURE 10 is a section on line 10—10 of FIGURE 7;
FIGURE 11 is a view showing the position of the cam in the off position of the brake;
FIGURE 12 is a view showing the position of the cam when the brake is full on;
FIGURE 13 is a view of the cam with the brake full on and indicating that adjustment is necessary.
FIGURE 14 is an elevation of the actuated shoe ends of a modified form of brake in which shoe ends are separated by a modified cam;
FIGURE 15 is a section on the line 15—15 of FIGURE 14; and
FIGURE 16 is a section on the line 16—16 of FIGURE 14.

In the brake shown in FIGURES 1, 2, 3 and 4 two opposed arcuate shoes 10 and 11 are mounted on a stationary back plate 12, the shoes carrying friction linings 13 adapted to engage with a rotatable drum (not shown).

The shoes at one end may fulcrum on a stationary adjuster (not shown) or as illustrated in a brake of the duo-servo type the shoes are connected at this end by a floating force-transmitting member 14 of adjustable length with which the ends of the shoes are held in engagement by a tension spring indicated at 15. At their other ends the shoes are adapted to be separated by a floating cam 16 comprising a dished member of elliptical outline having diametrically opposed fingers or lugs 17 engaging between webs 18 and 19 of the adjacent shoe ends. Return spring 20 maintains the shoe ends in engagement with the lugs in the off position of the brake.

The cam has a central opening 21 to receive a cam shaft 22 and opposed slots 23 extend from the opening to receive a blade or tongue 24 of rectangular cross-section on the cam shaft so that the cam is free to move circumferentially with the shoe ends when the brake is applied but is keyed to the cam shaft so that it moves angularly with the shaft.

The cam shaft 22 is rotatably mounted in bearings 25 and 26 on opposite sides of the stationary back plate 12 and the bearings are integral with or rigidly secured to the back plate 12 by means of bolts 27. The bearing 25 provides an anchor for the shoes in both directions of rotation of the drum and the cam shaft has a head 28 beyond the blade or tongue 24 to retain the cam which in turn retains the shoe webs 18 and 19 against the free end of the bearing 25. A collar 29 fixed to the cam shaft by a grub screw 30 engages a detent or slot 31 on the cam shaft and retains the cam shaft against end float.

When the shoes fulcrum at their non-actuated ends on a fixed anchor or anchors, and the cam is rotated by the cam shaft to separate the shoes at their other ends, the free circumferential movement of the cam permits centralizing of the shoes and in a brake of the duo-servo type as described above, the torque on the shoes is taken by the bearings 25 and 26 in which the cam shaft is rotatably mounted.

In order to facilitate the free circumferential movement of the cam the diametrically opposed lugs 17 are offset slightly on opposite sides of the transverse axis of the cam as particularly illustrated in FIGURES 7–10 inclusive, so that when the brake is in the released position as indicated in FIGURE 11, the main axis of the cam 16 assumes a position out of alignment with a plane normal to the radius of the brake passing through the axis of the cam shaft 22 and as illustrated in FIGURE 12, when the brake is fully applied the cam floats substantially in this plane. When wear has taken place on the friction linings 13, the cam takes up a position to the other side of this plane upon application of the brake (FIGURE 13) and it is desirable to incorporate an automatic adjuster of any known type to compensate for this wear.

In the brake shown in FIGURES 5 and 6, two independent pairs of arcuate shoes 40 and 41, and 42, 43 are mounted on a stationary back plate 44, each pair of shoes carrying friction linings 45 and 46 respectively adapted to engage with separate surfaces 47 and 48 of a rotatable drum 49. The shoes are connected at one end by separate floating force transmitting members 50 of adjustable length with which the end of the shoes of each pair are held in engagement by tension spring 51. At its other ends each pair of shoes is adapted to be separated independently by floating cams 16 actuated by cam shafts 52 and 53 as described above and the cam shafts may be connected for simultaneous application of each pair of shoes to the drum 49.

When each pair of shoes is actuated, the torque on the shoes may be taken respectively by the cam shafts 52 and 53 or bearings 54 and 55 in which the cam shafts are rotatably mounted.

In the embodiment illustrated in FIGURES 14, 15 and 16, the floating cam has a circular stem 60 carrying a head 61 formed from a parallel sided bar-like portion of which the ends 62 are radiused and extend by equal distances on opposite sides of the stem, the width of the bar-like portion being less than the diameter of the stem. The lower portion of the circular stem 60 is in the form of a tongue 63 having parallel sides which are offset slightly on opposite sides of the transverse axis of the head i.e. normal to the main axis of the head, and the tongue is slidably received in a slot or groove 64 formed in the upper end of a cam shaft 65.

The head is backed by a disc 66 which may be integral with the head or formed by a separate member attached to the head by screws 67. The cam is positioned between adjacent ends of shoes 68, 69 and the upper face of the disc 66 supports the webs 70, 71 of the shoes. In the opposition of brake illustrated the ends of the shoe webs engage with the sides of the head 61. When the cam is rotated by the cam shaft the radiused ends 62 of the head engage with adjacent shoe ends to separate the shoes and apply the brake, and movement of the cam in a circumferential direction relative to the cam shaft permits centralizing of the shoes. The torque on the shoes in the application of the brake is taken by pins 72, 73 fixed in a backing plate 74 on which the shoes are mounted, the pins projecting through slots 75, 76 in the shoe web 70 and 71 respectively.

I claim:

1. A shoe drum brake comprising a rotatable drum, a stationary back plate, opposed arcuate shoes mounted on said stationary back plate and having first adjacent ends and second adjacent ends, said shoes carrying friction linings for engagement with said rotatable drum, fixed abutment means on said back plate engageable by at least one end of one of said shoes, a shaft mounted in bearing means on said back plate for rotational movement about a fixed axis, a cam located between said first adjacent shoe ends, and mounted on and rotatable with said shaft in the application of the brake to separate said first shoe ends and apply said shoes to said drum, and means permitting a circumferential movement of the cam with said first shoe ends in the application of the brake.

2. A shoe drum brake comprising a rotatable drum, a stationary back plate, opposed arcuate shoes mounted on said stationary back plate and having first adjacent ends and second adjacent ends, said shoes carrying friction linings for engagement with said rotatable drum, fixed abutment means mounted on said back plate between said first adjacent shoe ends, a shaft mounted in bearing means on said back plate for rotational movement about a fixed axis, a cam located between said first adjacent shoe ends and rotatable with said shaft in the application of the brake to separate said first shoe ends and apply said shoes to said drum, said cam being mounted on said shaft, co-operating means on said shaft and on said cam permitting circumferential movement of the cam with the first shoe ends in the application of the brake, and formations on said cam for engagement with said first adjacent shoe ends, said formations normally occupying positions lying on a radius line mid-way-between said first adjacent shoe ends.

3. A shoe drum brake as claimed in claim 2, wherein said formations comprise diametrically opposed lugs.

4. A shoe drum brake as claimed in claim 3, wherein said lug are offset slightly on opposite sides of the transverse axis of said cam to facilitate circumferential movement of the cam when the brake is in the applied position.

5. A shoe drum brake comprising a rotatable drum, a stationary back plate, opposed arcuate shoes mounted on said stationary back plate and having first adjacent ends and second adjacent ends, said shoes carrying friction linings for engagement with said rotatable drum, fixed abutment means mounted on said back plate between said first adjacent shoe ends, a shaft mounted in said abutment means for rotational movement about a fixed axis, and a cam located between said first adjacent shoe ends and rotatable with said shaft in the application of the brake to separate said first shoe ends and apply said shoes to said drum, said cam being keyed to and mounted on said shaft by means permitting a circumferential movement of the cam with said first shoe ends in the application of the brake.

6. A shoe drum brake comprising a rotatable drum, a stationary back plate, opposed arcuate shoes mounted on said stationary back plate and having first adjacent ends and second adjacent ends, said shoes carrying friction linings for engagement with said rotatable drum, a fixed abutment means integral with bearing means mounted on said back plate between said first adjacent shoe ends, a shaft mounted in said bearing means for rotational movement about a fixed axis, a cam located between the first adjacent shoe ends and rotatable with said shaft in the application of the brake to separate said first shoe ends and apply said shoes to said drum, and inter-engaging portions on said shaft and said cam to key said cam to said shaft, and to transmit rotational movement from said shaft to said cam and permit a circumferential movement with said first shoe ends of said cam in the application of the brake, the movement allowed by direction of the inter-engaging portions, in the brake applying position, extending substantially at right angles to a radius line mid-way between said first adjacent shoe ends.

7. A shoe drum braking comprising a rotatable drum, a stationary back plate, opposed arcuate shoes mounted on said back plate and having first adjacent ends and second adjacent ends, said shoes carrying friction linings for engagement with said rotatable drum, a single torque taking anchor pin having a throughbore and adapted to be engaged by said first adjacent shoe ends, a shaft mounted in said bore in said anchor pin for rotational movement about a fixed axis, and a cam located between said first adjacent shoe ends and rotatable with said shaft in the application of the brake to separate said first shoe ends and apply said shoes to said drum, said cam being mounted on said shaft, means permitting a circumferential movement of the cam with said first shoe ends in the application of the brake.

8. A shoe drum brake comprising a rotatable drum, a stationary back plate, opposed arcuate shoes mounted on said back plate and having first adjacent ends and second adjacent ends, each shoe including a web having a slot, said shoes carrying friction linings for engagement with said rotatable drum, torque taking anchor pins each projecting into a slot and engageable with a web of a shoe, a shaft mounted in bearing means on said back plate and rotatable about a fixed axis, and a cam located between said first adjacent shoe ends and rotatable with said shaft in the application of the brake to separate said first shoe ends and apply said shoes to said drum, said cam being mounted on and rotatable with said shaft, and means permitting a circumferential movement of the cam with said first shoe ends in the application of the brake.

9. A shoe drum brake comprising a rotatable drum, a stationary back plate, opposed arcuate shoes mounted on said back plate and having first adjacent ends and second adjacent ends, a shaft mounted in bearing means on said back plate and rotatable about a fixed axis, a blade formed on said shaft, a cam located between said first adjacent shoe ends rotatable with said shaft in the application of the brake to separate said first adjacent shoe end and apply said shoes to said drum, said cam being formed with a slot of a length greater than said blade, said cam being mounted on said shaft with said blade located in said slot, whereby in the application of the brake cam slides relative to said blade so that said cam is permitted a circumferential movement, and diametrically opposed formations on said cam engaging between said first adjacent shoe ends and being offset slightly on opposite sides of the transverse axis of said cam to facilitate said circumferential movement of said cam when the brake is in the applied position, said blade and said slot extending substantially at right angles to a radial line mid-way between said first adjacent shoe ends to permit said circumferential movement of said cam when said shaft and said cam are in the brake applying position.

10. In a shoe drum brake comprising a rotatable drum, a stationary back plate, opposed arcuate shoes mounted on said stationary back plate and having first adjacent ends and second adjacent ends, said shoes carrying friction linings for engagement with said rotatable drum, a shaft mounted in bearing means on said back plate for rotational movement about a fixed axis, and a blade of rectangular cross section on said shaft; a cam comprising a dished member of elliptical outline having opposed lugs offset slightly on opposite sides of its transverse axis for engagement between said first adjacent shoe ends, said dished member having a central opening for receiving said cam shaft and opposed slots extending from said opening of a length greater than said blade on said shaft for receiving said blade whereby said cam is rotatable with said shaft in the application of the brake to separate said first adjacent shoe ends and apply said shoes to said drum, and said cam is permitted a circumferential movement with said first shoe ends in the application of the brake.

11. In a shoe drum brake comprising a rotatable drum, a stationary back plate, opposed arcuate shoes mounted on said stationary back plate and having first adjacent ends and second adjacent ends, each shoe including a web, said shoes carrying friction linings for engagement with said rotatable drum, and a shaft mounted in bearing means on said back plate for rotational movement about a fixed axis; a cam for location between said first adjacent shoe ends comprising a circular stem, a tongue and slot engagement between said shaft at its upper end formed from a parallel sided bar-like member with which said first adjcent shoe ends are adapted to engage, said ends of said member extending on opposite sides of said stem by an equal distance, and a disc on said stem below said bar-like member for supporting said shoe webs, whereby said cam is rotatable with said shaft in the application of the brake to separate said first adjacent shoe ends and apply said shoes to said drum, and said tongue and slot engagement permits a circumferential movement of said cam with said first shoe ends in the application of the brake.

12. A shoe drum brake comprising a rotatable drum, first and second braking surfaces on said drum, a stationary back plate, first and second pairs of opposed arcuate shoes mounted side-by-side on said back plate, each pair of shoes having first adjacent ends and second adjacent ends, said first pair of shoes carrying friction linings for engagement with said first braking surface on said drum, said second pair of shoes carrying friction linings for engagement with said second braking surface on said drum, a first shaft mounted in first bearing means on said back plate for rotational movement about a fixed axis, a second shaft mounted in second bearing means said back plate for rotational movement about a fixed axis, a first cam located between said first adjacent ends of said first pair of shoes and rotatable with said first shaft in the application of the brake to separate said first shoe ends and apply said shoes of said first pair to said drum, a second cam located between said first adjacent ends of said second pair of shoes and rotatable with said second shaft in the application of the brake to separate said shoe ends and apply said shoes of said second pair to said drum, said first and second cams being mounted on said first and second shafts respectively, co-operating first means on said first shaft and said first cam permitting a circumferential movement of said first cam with said first shoe ends of said first pair of shoes in the application of the brake, and co-operating second means on said second shaft and said second cam permitting a circumferential movement of said second cam with said first shoe ends of said second pair of shoes in the application of the brake.

13. A shoe drum brake as claimed in claim 12, and further including means for rotating both shafts independently.

14. A shoe drum brake as claimed in claim 12, and further including means for rotating both shafts simultaneously.

15. A shoe drum brake as claimed in claim 12, wherein formations are provided on both cams for engagement with said first adjacent shoe ends, and said formations normally occupy positions lying on radius lines mid-way between said first adjacent shoe ends.

16. A shoe drum brake as claimed in claim 12, and further including means for slidably keying each cam to its respective shaft.

17. A shoe drum brake as claimed in claim 16, wherein said means for slidably keying each cam to its respective shaft comprise inter-engaging portions on said shaft and said cam.

References Cited by the Examiner
UNITED STATES PATENTS

| | | | |
|---|---|---|---|
| 2,682,319 | 6/54 | Bennett | 188—79 |
| 2,770,325 | 11/56 | Dombeck | 188—78 X |

FERGUS S. MIDDLETON, *Primary Examiner.*

RALPH D. BLAKESLEE, ARTHUR L. LA POINT, *Examiners.*